United States Patent Office 3,088,797
Patented May 7, 1963

1

3,088,797
PROCESS FOR SEPARATION OF BORON-CONTAINING COMPOUNDS FROM MIXTURES CONTAINING SAME AND A HYDROGEN HALIDE
Jawad H. Murib, St. Bernard, Ohio, assignor to National Distillers and Chemical Corporation, New York, N.Y., a corporation of Virginia
No Drawing. Filed May 8, 1959, Ser. No. 811,808
8 Claims. (Cl. 23—14)

The present invention relates to a method for separation of halo-containing boron compounds from mixtures thereof with a hydrogen halide and which mixtures may also contain inert gases such as nitrogen, hydrogen, saturated aliphatic hydrocarbons, etc.

In broad aspect, the invention relates to a process wherein a mixture comprising a halo-containing boron compound and a hydrogen halide, such as hydrogen chloride, is contacted with a sulfide from the group consisting of diaryl sulfides and alkyl aryl sulfides under conditions whereby the halo-containing boron compounds are selectively complexed with the sulfide. The thus obtained complex can then be treated, such as at a higher temperature than that at which the complex was formed, to dissociate the halo-containing boron compounds from the complex and the liberated sulfide recycle to the process for contacting the mixtures containing the halo-containing boron compounds and the hydrogen halide to complex the halo-containing boron compounds. By use of the process embodied herein, a markedly effective and generally substantially quantitative separation and recovery of the boron-containing compounds can be accomplished with the added important advantage that the complexing agent (the sulfide) may be reused for extended periods of time by recycling in the process as the dissociation of the halo-containing boron compounds from the complex provides the sulfide in substantially non-contaminated form. Thus, the process embodied herein is a marked improvement over methods, known to those skilled in the art, such as for example the separation of substances such as boron trichloride from mixtures thereof with hydrogen chloride, hydrogen, etc. by adsorption of the boron trichloride on activated carbon, and recovery of the boron trichloride by heating as, in such a prior art process substantially less than quantitative recovery of the boron trichloride is generally obtained and substantial contamination of the carbon occurs, thereby substantially limiting the number of times it can be reused for adsorption of boron trichloride from such mixtures.

In practice of this invention, a mixture comprising a hydrogen halide and a boron-containing compound from the group consisting of boron trihalides, boron hydrogen halides, and mixtures thereof, is subjected to the aforesaid complex-forming reaction whereby the boron-containing compounds are separated from the hydrogen halide. Although the invention is particularly useful for such mixtures wherein the boron trihalide is boron trichloride, it can also be used for such mixtures containing boron trifluoride as the boron trihalide as well as mixtures containing both boron trichloride and boron trifluoride. Generally, such mixtures contain added components, such as is obtained in processes for production of boron hydrides or elemental boron from hydrogenation of boron trihalides, and in which case the mixtures contain, in addition to boron trihalide, haloboranes and hydrogen halide, inert gases such as hydrogen, nitrogen, etc. The present invention provides a particularly suitable method for separation of the boron-containing compound from such mixtures containing such additional components.

The sulfide employed in the process embodied herein is preferably diphenyl sulfide. However, other diaryl sulfides such as ditolyl sulfide (ortho, meta and para), phenyl tolyl sulfide, etc. may also be used as well as alkyl aryl sulfides such as methyl phenyl sulfide, ethyl phenyl sulfide, etc. Use of diaryl sulfides are preferred over the aliphatic-containing sulfide as the latter materials tend to decompose more easily when the halo-containing adducts are subjected to thermal dissociation. Although the process can be carried out by use of the sulfide in an amount substantially in excess of that stoichiometrically required to complex with the amount of the boron-containing compounds in the mixture from which such compounds are to be separated, use of the sulfide in substantially stoichiometric amounts is preferred, but the invention can be practiced with use, for example, of seven or more moles of the sulfide per mole of the boron-containing compound.

Generally speaking, the selective formation of the complex of the sulfide and the boron-containing compounds by contact of the aforesaid mixture with the sulfide is accomplished at a temperature of up to about 50° C. with substantially lower temperatures being preferred such for example, from about −10° C. to about 25° C. The selective formation of the desired complex can be effected by carrying out the process at reduced pressure, at atmospheric pressure, or at elevated pressures, as long as the pressure is higher than the dissociation pressure of the adduct at the temperature at which formation of the adduct is being effected. However, in preferred embodiments, atmospheric or elevated pressures such as up to about 20 atmospheres and, more specifically, up to about 2 atmospheres are used.

Following formation of the selectively complexed boron-containing compounds with the sulfide, the complex is subjected to a dissociation treatment to liberate the sulfide and the boron-containing components or components. Such dissociation may be carried out by heating the complex to a temperature sufficient to effect dissociation but below temperatures that result in substantial decomposition. Thus, the complex may, generally, be heated to from about 40 to about 200° C. as, at such temperatures, substantially quantitative recovery of substantially pure sulfide and boron-containing components is effected.

The process embodied herein can be carried out in continuous or batchwise manner and is adaptable to removal of boron-containing compounds from mixtures thereof with a hydrogen halide, e.g., hydrogen chloride, and other substances which do not form strong complexes with the sulfide. Thus, as aforesaid, the process embodied herein is particularly suitable for separating boron trichloride and boron hydrogen halides from mixtures thereof with hydrogen chloride and which can additionally contain substances such as hydrogen, nitrogen, inert hydrocarbons, etc.

In order to further describe the invention, the following embodiments are set forth for purposes of illustration and not limitation.

*Example 1*

A mixture of boron trichloride, hydrogen chloride and hydrogen at room temperature and a pressure slightly above atmospheric, 780 mm. Hg was bubbled through a solution of diphenyl sulfide in a saturated aliphatic oil (ave. mol. wt. 253) maintained at 0° C. The hydrogen and hydrogen chloride passed through the diphenyl sulfide while the boron trichloride was retained in the diphenyl sulfide. After removal of the $H_2$-HCl stream, the solid diphenyl sulfide-boron trichloride adduct was heated to 70–100° C. to regenerate the pure components, boron trichloride and diphenyl sulfide. The following table shows the results obtained from three runs carried out in this manner.

| Run No. | Initial amount in Starting Mixture [1] | | Actual ratio, diphenyl sulfide/BCl₃, millimoles | BCl₃ retained by diphenyl sulfide, millimoles | Percent Recovery of BCl₃ |
|---|---|---|---|---|---|
| | BCl₃, millimoles | HCl, millimoles | | | |
| 1 | 21.10 | 5.62 | [2] 3.85 | 18.43 | 98.7 |
| 2 | 21.15 | 4.27 | [2] 9.20 | 20.40 | 95.4 |
| 3 | 13.44 | 3.43 | [3] 1.60 | 11.45 | 100 |

[1] The amount of hydrogen gas in the mixture corresponded to $H_2/BCl_3 = 14/1$.
[2] No oil was used.
[3] Oil was used, weight ratio diphenyl sulfide/oil = 0.78.

*Example 2*

An anhydrous gaseous mixture containing 10.77 mmoles boron trichloride, 4.33 mmoles dichloroborane, 4.33 mmoles hydrogen chloride and 188 mmoles hydrogen, was bubbled at a pressure of about 790 mm. Hg through a solution of 12.68 mmoles diphenyl sulfide in about 2.0 grams of saturated aliphatic oil (ave. mol. wt. 253). The diphenyl sulfide-oil solution was maintained at 0° C. during the bubbling period. The exit hydrogen stream emerging from the diphenyl sulfide was passed through traps maintained at −196° C. This condensate contained all the hydrogen chloride originally present and only 2.5 mmoles of boron trichloride. The major portion of the boron containing constituents were retained by the sulfide-oil solution. The complexing solution was then isolated from the rest of the apparatus, attached to a vacuum line and evacuated for a few seconds while at 0° C. to remove any residual non-condensable gases. The complexed boron compounds were then heated at about 70° C. with pumping. The volatile materials recovered comprised 4.33 mmoles BHCl₂ and 9.27 mmoles BCl₃, as shown by hydrolysis and determination of the hydrogen evolved and analysis for boron and chloride content. The diphenyl sulfide generated contained essentially none of the boron compounds.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for separating boron-containing compounds from mixtures thereof with hydrogen chloride which comprises contacting a mixture comprising hydrogen chloride and a boron-containing compound from the group consisting of boron trichloride, boron hydrogen chlorides, and mixtures thereof with a diaryl sulfide to selectively complex the boron-containing compounds, and dissociating the resulting complex to recover the boron-containing compounds.

2. A process, as defined in claim 1, wherein the mixture comprises boron trichloride and hydrogen chloride.

3. A process, as defined in claim 1, wherein the mixture comprises boron trichloride, hydrogen chloride and dichloroborane.

4. A process, as defined in claim 1, wherein the sulfide is diphenyl sulfide.

5. A process, as defined in claim 1, wherein the mixture is contacted with an amount of the sulfide substantially stoichiometrically sufficient to complex the boron-containing compounds.

6. A process, as defined in claim 1, wherein the mixture is contacted with the sulfide at a temperature up to about 50° C.

7. A process which comprises contacting at a temperature up to about 25° C. a gaseous mixture comprising boron trichloride and hydrogen chloride with an amount of diphenyl sulfide at least substantially stoichiometrically sufficient to selectively complex the boron trichloride in said mixture and form a boron trichloride-diphenyl sulfide complex, and thermally dissociating said complex to recover the boron trichloride.

8. A process, as defined in claim 7, wherein said gaseous mixture contains dichloroborane, the diphenyl sulfide is used in an amount at least substantially stoichiometrically sufficient to complex the boron trichloride and the dichloroborane, and the resulting complexes are subjected to thermal dissociation.

References Cited in the file of this patent

UNITED STATES PATENTS

| 2,377,396 | Axe | June 5, 1945 |
| 2,378,968 | Axe | June 26, 1945 |
| 2,537,076 | McCaulay et al. | Jan. 9, 1951 |

OTHER REFERENCES

Fieser et al.: "Organic Chemistry," 2nd Edition, 1950, pages 139–140.